No. 638,511. Patented Dec. 5, 1899.
G. HEIDEL.
ELECTRIC LIGHTING APPARATUS FOR VEHICLES.
(Application filed Jan. 21, 1899.)
(No Model.)
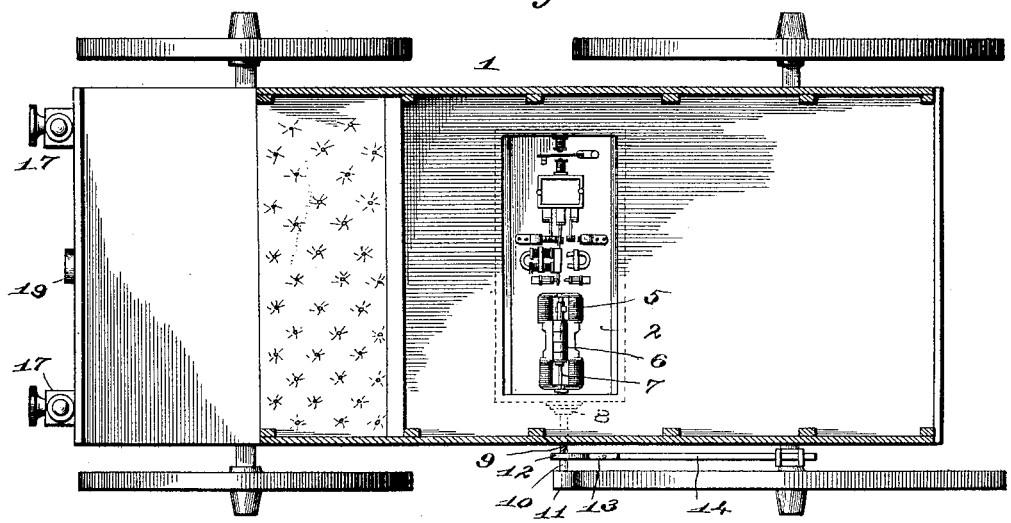
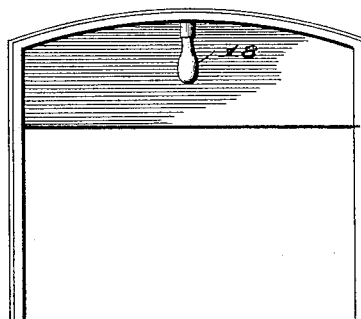
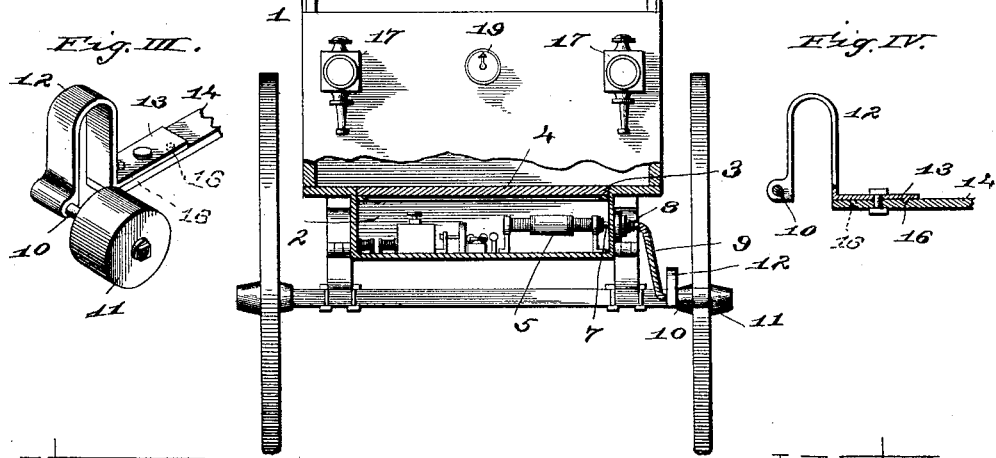
Witnesses
G. A. Vauberschmitt
E. S. Knight
Inventor
Gustavos Heidel
By Knight Bro
Attorneys

UNITED STATES PATENT OFFICE.

GUSTAVOS HEIDEL, OF ST. LOUIS, MISSOURI, ASSIGNOR TO THE GLOBE ELECTRIC COMPANY, OF SAME PLACE.

ELECTRIC-LIGHTING APPARATUS FOR VEHICLES.

SPECIFICATION forming part of Letters Patent No. 638,511, dated December 5, 1899.

Application filed January 21, 1899. Serial No. 702,928. (No model.)

*To all whom it may concern:*

Be it known that I, GUSTAVOS HEIDEL, a citizen of the United States, residing at the city of St. Louis, in the State of Missouri, have invented certain new and useful Improvements in Electric-Lighting Apparatus for Vehicles, of which the following is a full, clear, and exact description, reference being had to the accompanying drawings, forming part of this specification.

My invention relates to an electric-lighting apparatus for use upon vehicles and comprising a construction whereby a dynamo carried upon a vehicle is operated through the traveling of the wheels of the vehicle to generate the electric current and from which dynamo the current is conveyed through switches and controllers to and through a storage battery to suitable lamps carried upon the vehicle.

My invention consists in features of novelty hereinafter fully described, and pointed out in the claim.

Figure I is a top view of the wagon to which I have shown my invention applied, the cover of the wagon being shown in horizontal section. Fig. II is a front elevation of the wagon shown in Fig. I, with the lower part of the body thereof illustrated in vertical section and my apparatus shown in elevation. Fig. III is a detail perspective view of the friction-wheel and support that bears against the vehicle-wheel to furnish the power for operating the dynamo. Fig. IV is a longitudinal sectional view of the outer end of the friction-wheel support shown in Fig. III.

1 designates the vehicle to which the invention is shown applied. This vehicle may be of any description, as the lighting apparatus embodied in my invention is capable of application to vehicles of any kind. Beneath the body of the vehicle and carried thereby is a box 2, in which the mechanism of the lighting apparatus is contained, the said box being accessible from the interior of the vehicle through an opening 3, closed by a trap-door 4. (See Fig. II.)

5 designates a dynamo mounted on suitable supports and having an armature 6, carried by an armature-shaft 7. The armature is provided with the usual appurtenances and is in connection with a storage battery and circuit-controllers, for which no invention is herein claimed.

Connected to the coupling 8 is a flexible shaft 9, that leads to the shaft 10 of a friction-roller 11, supported in proximity to one of the ground-wheels of the vehicle, so as to bear in contact with the tire or rim of said wheel. The shaft of the friction-roller 11 is mounted in a spring-hanger 12, connected by an arm 13 to a supporting-bar 14, attached to the axle of the vehicle. (See Fig. I.) The arm 13 of the spring-hanger 12 is connected so that the hanger may be swiveled on its supporting-bar 14 to permit of the friction-roller 11 being turned away from contact with the vehicle-wheel when desired. The hanger-arm 13 is held from accidental turning by nibs 16 engaging in opposing recesses in the supporting-bar. (See Figs. III and IV.)

17 designates lamps mounted on the dashboard of the vehicle, and 18 designates a lamp mounted at the roof of the vehicle, to all of which the current from the apparatus is designed to be supplied.

19 designates an indicator for showing the amount of voltage carried in the storage battery, through means of which the amount of electricity contained in the battery may be ascertained at any time.

Having thus described my invention, the following is what I claim as new therein and desire to secure by Letters Patent:

In an electric-lighting apparatus for vehicles, a dynamo, a supporting-bar, a spring-hanger swiveled to said supporting-bar, ribs or projections on said hanger adapted to engage in recesses in the said supporting-bar to retain said hanger in line with said bar, a friction-wheel having its shaft mounted in said spring-hanger and adapted to bear against a rotary part of the vehicle, and means of connection between said friction-wheel and the armature-shaft of the said dynamo; substantially as described.

GUSTAVOS HEIDEL.

In presence of—
E. S. KNIGHT,
G. A. TAUBERSCHMIDT.